June 9, 1953 C. L. GARRISON 2,641,092
ACTUATOR FOR MACHINE ELEMENTS
Filed Aug. 11, 1951 2 Sheets-Sheet 1
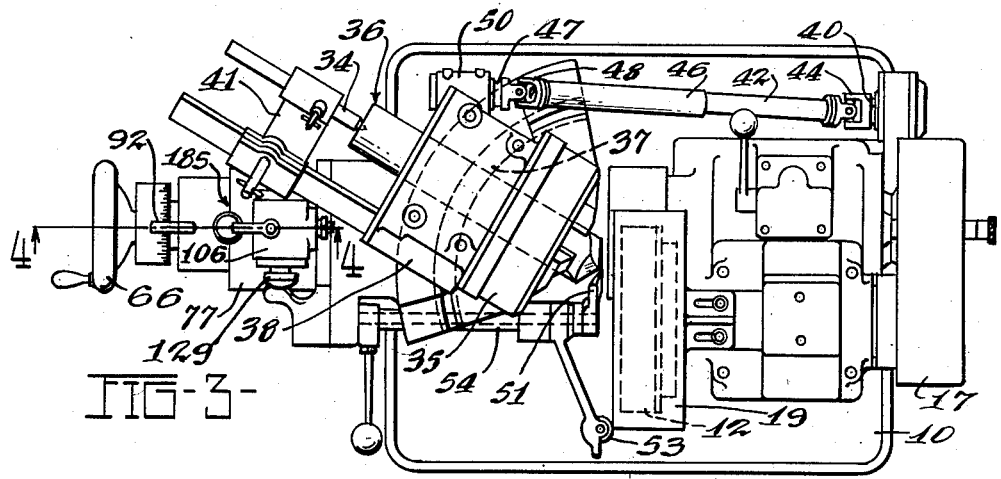
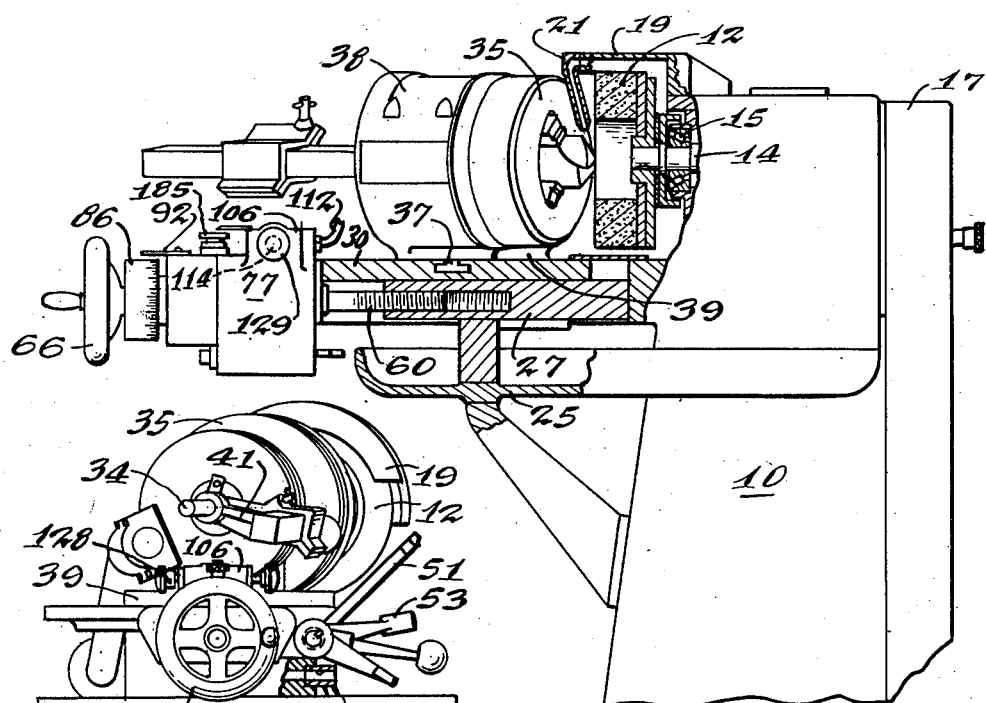
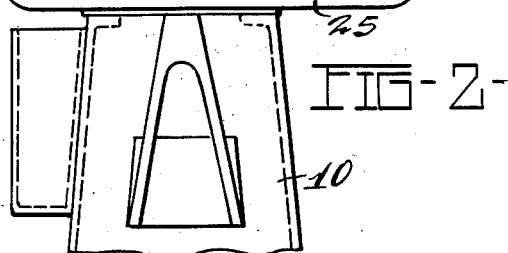
INVENTOR:
CLIFFORD L. GARRISON.
BY
Harry P. Emsberger
ATTORNEY June 9, 1953     C. L. GARRISON     2,641,092
ACTUATOR FOR MACHINE ELEMENTS
Filed Aug. 11, 1951     2 Sheets-Sheet 2
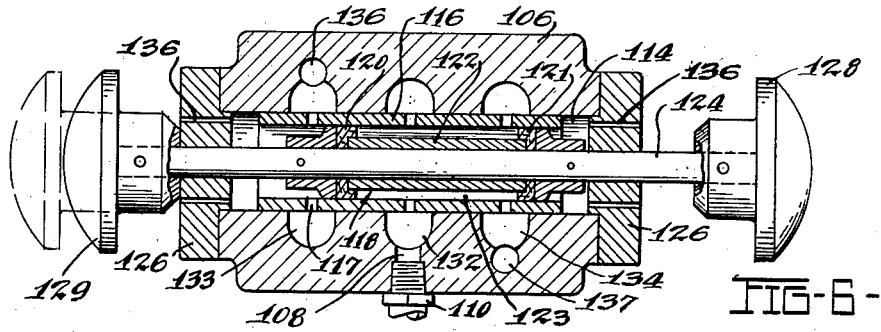
FIG-6-
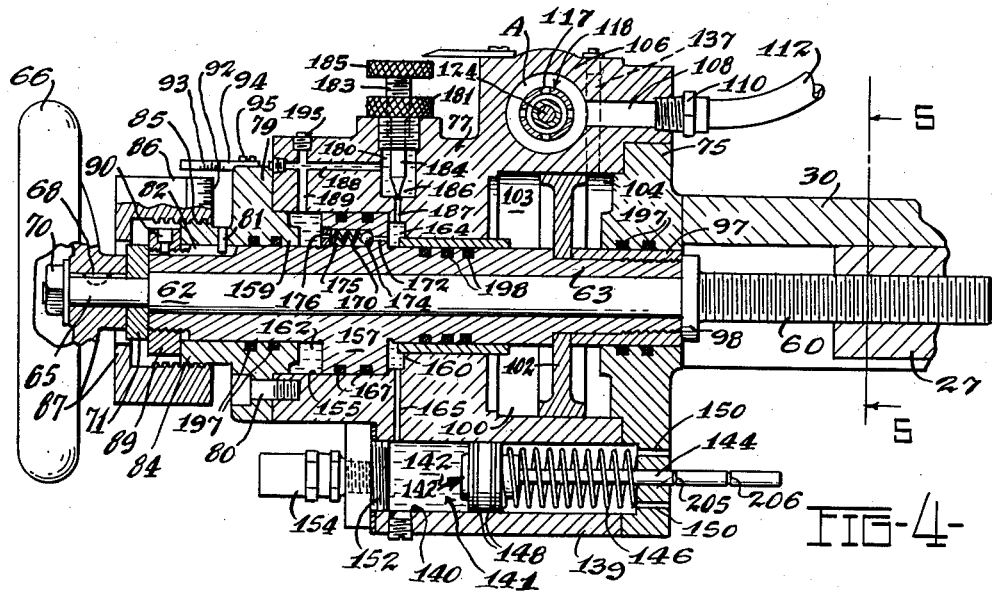
FIG-4-
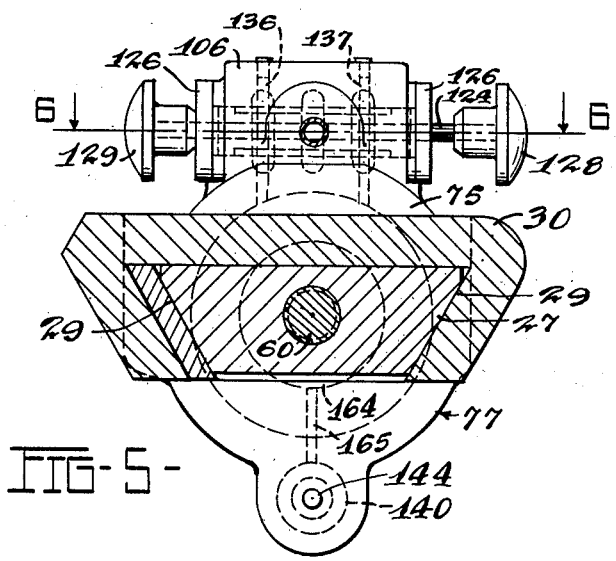
FIG-5-
INVENTOR
CLIFFORD L. GARRISON.
BY
Harry O. Ernsberger
ATTORNEY Patented June 9, 1953

2,641,092

UNITED STATES PATENT OFFICE 2,641,092

ACTUATOR FOR MACHINE ELEMENTS

Clifford L. Garrison, Adrian, Mich., assignor to Oliver Instrument Company, Adrian, Mich., a corporation of Michigan Application August 11, 1951, Serial No. 241,462

10 Claims. (Cl. 51—165)

This invention relates to apparatus for actuating or operating a movable machine element such as a table or work support and more especially to a power actuated means for effecting work feed traverse and reverse traverse of a grinding machine table.

The invention contemplates the provision of fluid actuated means for reciprocating a work supporting table of a grinding machine in a manner whereby the work feed or work performing cycle or movement of the table may be controlled or regulated at a desired predetermined rate of linear travel, the arrangement embodying means for effecting rapid reverse traverse of the table.

An object of the invention is the provision of a fluid actuated means for effecting work feed traverse and reverse traverse movements of a table of a grinding machine incorporating a hydraulic metering means for regulating and determining the rate of linear movement of the table, the hydraulic means embodying a check valve arrangement operable to effect rapid reverse traverse of the table at the termination of a work performing cycle.

Another object of the invention is the provision of a hydraulic arrangement having a metering or measuring device for regulating the rate of traverse of a machine element in one direction, the hydraulic arrangement embodying a variable volume reservoir for the liquid medium to insure an effective supply for the metering device whereby liquid under comparatively low pressure is contained within the system at all times during its operation.

Sitll another object of the invention resides in the provision of an actuating means for moving a machine element through work feed cycles and reverse traverse cycles in which the rate of movement of the work feed cycle is controlled by regulating the flow of a liquid through an orifice into a liquid reservoir which is formed with a movable wall resiliently biased to set up a liquid pressure to insure an effective supply of metering medium providing for a predetermined constant speed of the movable element, the apparatus including an air actuated means for causing work feed and reverse traverse movements of the machine element.

Still another object of the invention resides in a fluid actuated table for a machine tool, the arrangement embodying a metering means operable upon a liquid medium for controlling the movement of the table motivated by an air actuated means and wherein the table may be manually moved or adjusted at any time irrespective of the operation of the air actuated device.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is an elevational view partly in section showing operative elements of a machine particularly useable for grinding drills;

Figure 2 is an end view of the construction shown in Figure 1;

Figure 3 is a top plan view of the arrangement illustrated in Figure 1;

Figure 4 is an enlarged vertical sectional view taken substantially on the line 4—4 of Figure 3;

Figure 5 is a transverse vertical sectional view taken substantially on the line 5—5 of Figure 4, and Figure 6 is a horizontal sectional view taken substantially on the line 6—6 of Figure 5.

While I have illustrated a form of my invention as embodied in a work table operating arrangement of a grinding machine, it is to be understood that I contemplate the utilization of the principles of the invention for operating other machine or component elements where it is desirable or necessary to regulate and control the rate of travel of an element.

The arrangement of the present invention has been illustrated in connection with a drill grinder of the type disclosed and described in U. S. patent to Oliver No. 2,252,303 for feeding or presenting a twist drill to a grinding wheel to sharpen or resharpen the drill point. The general arrangement of a grinding machine of this character is illustrated in Figures 1 through 3 wherein the machine is inclusive of an upright frame 10 preferably of hollow construction in which is disposed a motor (not shown) for driving the grinding wheel and rotating the chuck adapted to support drills during grinding operations and to supply coolant liquid for application to the grinding zone. The hollow frame 10 encloses suitable gearing and driving mechanism more especially detailed and described in the above mentioned Oliver patent for rotating the grinding wheel 12 supported upon a suitable arbor 14 journaled in antifriction bearings 15 and causing compound longitudinal and eccentric movements of the grinding wheel for contouring the spiral end surfaces of twist drills.

A cover member 17 extends vertically of the frame 10 and encloses a driving belt (not shown) for rotating the grinding wheel and other elements of the operating mechanism. A suitable shroud 19 partially encloses the grinding wheel as shown in Figure 2 and a tubular member 21 connected with a supply of liquid coolant for the grinding wheel which is conveyed to the grinding zone through said tube. The tube is connected with a suitable pump (not shown) for continuously supplying fluid to the wheel during operation of the machine.

The frame 10 is formed with a laterally disposed ledge portion 25 which supports a member 27 provided with parallel angularly disposed surfaces 29 forming ways or guides upon which a work supporting table 30 is slidably and reciprocably mounted. The table 30 supports a housing 38 carrying chuck or element 35 for supporting a drill 36 which is moved into engagement with the grinding wheel by relative movement of the table 30. The end cutting edges of the drill are adapted for engagement with the grinding wheel 12. The table 30 is formed with an arcuately shaped slot 37 of T-shaped cross-section and the base plate 39 of the chuck housing is formed with an arcuately shaped tongue projecting into the slot 37 being slidably arranged therein for varying the angular position of the working axis of the chuck with respect to the axis of rotation of the grinding wheel 12.

Means are provided for rotating the chuck 35 to effect a rotative movement of the drill 36 as it is moved into engagement with the grinding wheel. A stub shaft 40, driven by mechanism contained within the hollow frame 10, is connected to a shaft 42 by means of a universal coupling 44, the shaft 42 being telescopingly and drivably connected with a sleeve 46 which is joined to a stub shaft 47 by means of a second universal coupling 48. The stub shaft 47 is journaled in a housing 50 supported by the chuck housing 38. The housings 38 and 50 enclose suitable gearing whereby the chuck 35 is rotated through the operation of the shaft 42 and sleeve 46 by the mechanism contained within the main frame 10. The universal couplings 44 and 48 and the telescopically connected shaft 42 and sleeve 46 provide means to facilitate the various positions of angularity of the chuck 35 with respect to the supporting table 30 to accommodate drills having point ends of different angles. The drill 36 to be ground or sharpened is adapted to be positioned and properly located in the chuck 35 by means of gauge member 51. A wheel truing device 53 is supported upon a sleeve surrounding the shaft 54 for truing the operative surface of the grinding wheel, a construction more particularly described in the patent to Edd C. Oliver No. 2,252,303.

The present invention involves a power actuated arrangement for moving a machine element such as the table 30 supporting the chuck 35 and the work carried thereby relative to the table support 27 and the grinding wheel 12. In the operation of grinding machines and particularly of the character illustrated herein, it is desirable to feed the work into the wheel at a predetermined constant rate of travel. Heretofore as shown and described in the above mentioned patent the work has been fed or moved into engagement with the wheel by manual means through the rotation of a screw and hand wheel arrangement. It is however quite difficult, especially in commercial operations where unskilled labor may be utilized, to manually feed the work to the grinding wheel at a constant rate of travel. The arrangement of the present invention utilizes pressure fluid as a motivating medium for moving the work table and embodies a fluid metering arrangement independent of the motivating fluid for regulating the rate of the work feed traverse movement of the table.

Referring more particularly to Figures 4 and 5 the relatively stationary member 27 supporting the table 30 for slidable movement is formed with a threaded portion to receive a threaded shaft 60 having an unthreaded portion 62 extending through a sleeve 63 and having at its outer end a tenon 65 of reduced diameter to which is secured a manipulating means or hand wheel 66. The hand wheel is arranged to rotate the screw 60 through the medium of a key 68, the hand wheel being retained on the tenon 65 by means of a securing nut 70. A thrust collar 71 is disposed between the hand wheel and the sleeve 63. The table 30 is associated with the sleeve 63 in a manner hereinafter described whereby manual rotation of the hand wheel 66 will thread the shaft 60 relative to the member 27 so as to effect a manual feed of the table 30 if desired.

Secured to the work supporting table 30 by means of screws (not shown) is a member or plate 75 which in turn is secured to a body member or housing 77 by suitable screws (not shown). Mounted at the opposite end of the body or housing 77 is a closure plate member 79 secured to the housing by screws 80. The member 79 is provided with a pin or key 81 projecting into a keyway or kerf 82 formed longitudinally in the sleeve 63 whereby the body or housing 77 and members 75 and 79 are slidable relative to and longitudinally of the sleeve 63. The member 76 is provided with a tenon 84 formed with threads 85 to receive a threaded collar or fitting 86 provided with an inwardly extending abutment or flange 87 which is adapted to cooperate with a collar 89 secured to the sleeve 63 by means of a set screw 90 to limit the movement of the table 30 and associated elements in a righthand direction as viewed in Figure 4. The barrel or sleeve 86 is provided with graduations 92 which cooperate with indices 93 inscribed upon a bar or index 94 secured to member 79 by means of a screw 95. The graduations 92 and indices 93 cooperate as a micrometer arrangement to enable an operator to minutely determine the relative position of the sleeve and abutment 87 formed thereon to regulate or limit the distance of travel of the table 30 during a work feed movement or traverse thereof.

The housing or body 77 is formed interiorly with a cylindrical bore forming a chamber 100 in which is disposed a piston 102 carried by the sleeve 63 and held in place by a bushing 97 and nut 98, the piston or wall 102 dividing the chamber 100 into two fluid receiving compartments 103 and 104. The compartments 103 and 104 are adapted to selectively receive fluid under pressure, such as compressed air, for the purpose of moving the housing 77, table 30 and associated elements in work feed or reverse traverse directions dependent upon the admission of air at one side or the other of the piston or wall 102. The admission of compressed air to the compartments 103 and 104 is controlled by a suitable valve mechanism carried by a boss portion 106 integrally formed with and extending above the body 77. The portion 106 is formed with a central duct 108 adapted to receive a fitting 110 to which is connected a flexible tube 112, the latter being connected with a source of compressed air or other fluid under pressure which is conveyed to the chamber 100 for actuating the table 30.

As shown in Figure 6, the boss 106 is formed with a transversely disposed bore 114 in which is fixedly secured a bearing sleeve 116 having perforations 117 to facilitate air flow to and from the compartments 103 and 104. Slidably mounted within the sleeve 116 is a valve means 118 comprising spaced walls 120 and 121 separated by a spacing sleeve 122 providing an annular space 123 serving as an air distributing manifold. The ends of the bore 114 are closed by means of plates 126, the plates having openings to accommodate the rod 124 and air exhaust ducts or vents 136. Manipulating means are provided for the rod including knobs or finger pieces 128 and 129 for manually effecting slidable movement of the rod and the valve means to selectively direct pressure fluid from the duct 108 into the compartments 103 and 104.

Formed in the boss 106 are three annular chambers 132, 133 and 134 as shown in Figure 6, the central chamber 132 being in registration with the air supply duct 108. The valve means 118 is dimensioned and proportioned so that the space or manifold 123 between the abutment walls 120 and 121 serves to convey air under pressure either to the chamber 133 or the chamber 134 dependent upon the relative position of the valve means. The chamber 133 is in communication with the compartment 103 by means of a bore or passage 136 while the chamber 134 is in communication with the compartment 104 through the medium of a bore or passage 137.

With the valve means in the position shown in Figure 6, pressure air is conveyed through duct 108, annular chambers 132 and 134 and bore 137 into compartment 104 shown in Figure 4. As the piston 102 is carried by sleeve 63 which is in a relatively fixed position by means of the threaded connection between shaft 60 and member 27, the housing 77, table 30 and mechanism carried thereby, will be moved in a righthand direction as viewed in Figure 4, the movement being limited by engagement of the abutment flange 87 with the collar 89.

The arrangement of the invention embodies a fluid metering means or device for controlling or regulating the rate of linear travel of the table 30 under the influence of air pressure in compartment 104. The housing 77 is formed with a depending portion 139 provided with a cylindrical bore 140, one end zone 141 of which is adapted to contain a supply of liquid as for example oil 142. Slidably disposed in the bore 140 is a relatively movable wall or plunger 142' provided with a rod 144 which extends through an opening formed in the portion of plate 75 fitting over one end of the bore 140. Disposed between the plate 75 and piston or wall 142' is a resilient means preferably in the form of an expansive coil spring 146 for exerting pressure upon or biasing the wall 142' toward the lefthand end or liquid containing zone 141 of the bore 140 as viewed in Figure 4 to impress a comparatively low pressure on the liquid 142 of approximately 5 to 20 lbs. per square inch.

The exterior periphery of the piston 142' is provided with peripheral grooves to accommodate sealing rings 148 to prevent leakage of liquid past the piston. The plate 75 is provided with pressure equalizing vent openings 150 establishing communication between the chamber containing the spring 146 and the atmosphere. The opposite end of the bore 140 is interiorly threaded to receive a closure 152 which is provided with a valved fitting 154 for filling or replenishing the oil supply contained in the space 141 at the lefthand side of the piston 142' as viewed in Figure 4.

The housing or body 77 is formed with a cylindrical recess or bore 155 forming a chamber into which projects an enlarged piston-like portion 157 preferably formed integrally with the sleeve 63. The open end of the bore or cylindrical recess 155 is closed by the plate or fitting 79 having a flange 159 extending into the recess. The housing or body 77 is also formed with an annular recess 160 at the terminus of the chamber formed by the recess 155. The piston-like portion 157 is spaced from the end wall of the flange 159 providing an annular chamber or compartment 162 to accommodate movement of the body or housing 77 relative to the sleeve 63. The annular recess 160 forms a chamber 164 adapted to receive oil or other fluid from the reservoir or supply chamber 141 through a duct or passage 165. The piston-like portion or wall 157 is formed with peripheral grooves to accommodate sealing rings 167 to establish a seal with the wall 155 of the recess.

The piston portion 157 is formed with an elongated chamber 170 extending parallel with the axis of the shaft 62 and has a restricted passage or orifice 172 in communication with chamber 154. Disposed in chamber 170 is a ball-like check valve 174 which is normally resiliently biased toward closed position by means of a coil spring 175, the latter being held in place by a fitting, the latter having an opening 176 therethrough in communication with the chamber 162. When the ball check valve 174 is opened during the operation of the device under conditions hereinafter explained, oil from the chamber 164 may flow through the passages 172, 170 and 176 into the chamber 162. The ball check valve 174 prevents the flow of oil in the opposite direction through the passages.

The apparatus is inclusive of a fluid bypass arrangement between chambers 162 and 164 incorporating a metering arrangement for regulating or controlling the rate of linear travel of the element or table 30 of a work feed traverse thereof, i. e. during movement of the table in a righthand direction as viewed in Figure 4. The body or housing 77 is formed with a bore or chamber 180 having a threaded portion to receive a bushing 181, the latter having an interiorly threaded bore to accommodate the threaded portion 183 of a metering needle or valve 184, the valve being provided with a finger piece or button 185 for manually adjusting the relative position of the metering needle 184. The tapered extremity 186 of the valve 184 is adapted for cooperation with a passage 187 establishing communication between chambers 164 and 180, the relative position of opening of the valve 184 determining the rate of flow of oil or other fluid past the valve. A pair of intercommunicating ducts 188 and 189 establish communication between chamber 180 and chamber 164 whereby the oil or other fluid contained in chamber 162 may be metered or its flow rate into chamber 164 controlled or regulated by the relative position of adjustment of the needle valve 184. By this means the rate of travel of the table 30 in a righthand direction as viewed in Figure 4 may be established or predetermined by the proper adjustment of the needle valve 184 to regulate fluid flow through the bypass means.

The chamber provided by the bore 140 provides a reservoir to at all times supply the metering system with oil 142, the pressure of spring 146 serving to impress a comparatively low pressure upon the oil in the chambers 162, 164 and the bypass and metering arrangement so as to eliminate the presence of air bubbles which would cause an uneven or irregular work feed traverse of the table 30 by reason of the high compressibility characteristic of a gas as compared with a substantially incompressible liquid. A plug 195 is threaded into the upper terminus of the vertically disposed duct 189. The plug may be removed in order to initially vent or bleed out any air which may be in the oil chambers and passages.

The plate 75 and the closure member 79 are provided with grooves to accommodate sealing rings 197 and the periphery of the mid-portion of the sleeve 63 is formed with grooves to accommodate sealing rings 198, the sealing devices preventing the escape or intertransfer of oil or air under pressure between the air actuator and the oil metering arrangement. The operation of the device is as follows:

When it is desired to shape and sharpen a drill or resharpen a worn drill the same may be inserted in the chuck 35 and accurately centered by means of a centering member 34 carried by an adjustable supporting means 41, the adjustable feature making possible the accommodation of the mechanism for grinding or processing drills of different lengths. The housing 38 supporting the chuck 35 is adjusted about the arcuate path of the slot 37 to the desired angle at which the drill point is to be ground or sharpened. The housing 38 may be secured in the properly adjusted angular position by means of bolts (not shown). The gauge member 51 is moved into the path of the drill 36 and the drill is advanced in the chuck into engagement with the gauge 51 to establish the initial position of the drill in the chuck after which the gauge arm 51 is withdrawn to a position out of use.

In grinding a drill, the grinding wheel 12 is supported and operated in a manner whereby the wheel moves reciprocably along its axis of rotation and is simultaneously moved in an eccentric path concomitantly with its rotation as more particularly disclosed and described in the United States patent to Edd C. Oliver No. 2,252,303. The rotation of the chuck 35 through the driving shafts 62 and 46 is also geared or operated in synchronized relation with the mechanism for reciprocating and causing eccentric movement of the grinding wheel during grinding operations. In this manner the compound movements of the grinding wheel in relation to the rotation of the drill 36 through the rotation of the chuck 35 establishes the proper spiral formation and cutting edges on the extremity of the drill.

The hand wheel 66 is then rotated in a direction to thread the shaft 60 into the member 27 to advance the table 30, chuck 35 and drill 36 until the extremity of the drill is just in contact or just short of contact with the abrasive face of the grinding wheel 12. The operator manually rotates the collar or sleeve member 86 bearing the graduations 92 relative to the member 79 to determine the extent of movement of the drill during a grinding operation, the limit of movement being determined by the flange 87 on the sleeve 86 engaging the outer uniplanar surface of the collar 89. The flange and collar cooperate to provide abutment means for limiting the extent of movement of the drill into the grinding wheel, thus predetermining the duration of each grinding cycle. The operator may accurately determine the amount of drill stock to be ground away by rotating the sleeve 86 to the desired position indicated by the relative relation of the graduations 92 on the sleeve to the indices on the bar 94.

The chamber 140 being filled with oil is subjected to static pressure under the influence of spring 146 so that the duct 165, annular chambers 164, 162 and passages 188, 189 are filled with oil or other suitable fluid. To initiate the automatic work feed traverse of the table 30 to advance the drill into the grinding wheel, the operator moves the valve shaft 124 by manipulating either button 128 or 129 to establish flow of compressed air or other fluid under pressure from a supply through the tube 112, duct 108, through the valve chamber provided by the annular space around the sleeve 122 between abutment walls 120, 121, chamber 134 and passage 137 into compartment 104 at the righthand side of the piston 102 as viewed in Figure 4. The fluid pressure built up in compartment 104 against the relatively stationary piston or wall 102 causes movement of the housing 106, table 30, chuck 35 and the drill carried thereby in a righthand direction. The rate of movement of the table and associated mechanism is dependent upon the size of the opening provided by adjustment of the needle valve 184 projecting into the mouth of the orifice or passage 187 for determining the rate of flow of fluid from the chamber 162 through passages 189, 188, 189 and 137 into chamber 164. Thus during a work feed cycle or traverse of the table 30, the oil in chamber 162 is forced into the chamber 164 under the pressure of the fluid in compartment 104 at the rate permitted by the adjustment of the needle valve 184 moving the rotating drill 36 into the grinding wheel to sharpen the drill on a proper spiral until the flange 87 on the sleeve 86 engages the abutment or collar 89 at which time the grinding ceases.

At the completion of grinding cycle, the operator manually moves the valve shaft 124 in the opposite direction to cause flow of the compressed air or other pressure fluid from duct 112 through passage 132, the valve chamber adjacent sleeve 122, chamber 133 and passage 136 into the compartment 103 at the lefthand side of the piston 102 as viewed in Figure 4. Under the influence of the fluid pressure in compartment 103, the housing 106, table 30 and associated elements are urged in a lefthand direction, thus reducing the volumetric size of the chamber or recess 164 setting up a pressure upon the oil contained therein. This pressure builds up rapidly causing the ball valve 174 to move away from its seat and permitting the oil in chamber 164 to be rapidly returned by way of the passages 172, 170 and 176 into the chamber 162 to effect return movement or reverse traverse of the housing 106, table 30, and elements carried thereby, to their initial position. In this manner the drill is quickly withdrawn after completion of the grinding cycle and may be removed and another inserted preparatory to a successive grinding operation.

Over extended periods of operation, some oil may seep past the sealing rings and deplete the supply in the reservoir 140. To indicate the amount of oil in the reservoir or chamber 140, the rod 144 is provided with circumferential grooves forming indicators 205 and 206. When the indicator 205 is in the relative position in proximity with the righthand face of the plate 75 as illustrated in Figure 4, the reservoir 140 has the requisite amount of oil. After seepage depletes the oil supply the relative position of piston 142 is changed and the indicator 206 is moved nearer the face of the plate 75. By this means the operator is apprized that the reservoir should be replenished and this may be accomplished by injecting oil or other fluid through the valve fitting 154.

It should be noted that the operator may at any time move the housing 77 and table 30 by manipulating the handwheel 66 to cause relative longitudinal movement of the shaft 60 with respect to the support 27 irrespective of whether the fluid actuating means is in operation. Furthermore the operator may instantly render the automatic table feeding means operative to move the table in either direction by manipulation of the air control valve means 118.

While I have illustrated the arrangement of my invention as utilized for effecting reciprocating movements of a work supporting table of a grinding machine, the invention may be utilized to obtain reciprocating movements of other machine elements without departing from the spirit and scope of the invention.

What I claim is:

1. In combination, means for actuating a relatively movable machine element including a housing associated with the element; said housing being formed with a chamber; a member having a portion extending into said housing; said member having a wall separating the chamber into two compartments; means for selectively supplying pressure fluid to said compartments to effect reciprocating movements of said housing and the machine element; means for controlling the rate of travel of said housing and element in one direction including a pair of liquid receiving compartments formed in said housing; means carried by said member defining said liquid receiving compartments; a passage establishing communication between said liquid receiving compartments; an adjustable valve means for regulating the flow of liquid through said passage for determining the rate of movement of said housing and machine element; a reservoir adapted to contain a supply of liquid for said liquid receiving compartments, and means for constantly maintaining said liquid receiving compartments filled with liquid from said reservoir.

2. In combination, means for actuating a relatively movable machine element including a housing formed with a cylindrical interior chamber; said housing being connected to the relatively movable machine element; a sleeve extending into said housing; said sleeve having a wall portion separating the chamber into two compartments; means for supplying pressure fluid alternately to said compartments to effect reciprocating movements of said housing and machine element; means for controlling the rate of travel of said housing and element including a pair of liquid receiving compartments formed in said housing; a wall portion on said member defining said compartments; a passage establishing communication between said liquid receiving compartments; means for regulating the flow of liquid through said passage from one liquid receiving compartment to the other for determining the rate of movement of said housing and machine element, and means for maintaining a pressure upon the liquid in said compartments.

3. In combination, means for effecting reciprocating movements of a machine element including a support; a housing; a member connected with the support extending into the housing; a pair of spaced chambers formed in the housing; wall portions on said member separating each of said chambers into two compartments; means for conveying pressure fluid selectively to one set of compartments; the other set of compartments adapted to contain a liquid; a passage connecting said liquid receiving compartments; a one way valve in said passage; a fluid bypass connecting said liquid receiving compartments; a manually operated metering valve in said bypass for controlling flow of liquid from one liquid receiving compartment to the other, and means for constantly maintaining the liquid under pressure.

4. In combination, means for reciprocating a work supporting table including a support therefor; a housing formed with a cylindrical interior chamber connected with said table and movable therewith; a member connected with the support and having a portion extending into said housing; said member having a wall portion separating the chamber into two compartments; means for supplying compressed air selectively to said compartments to effect reciprocating movements of said housing and table; a liquid receiving chamber formed in said housing; means on said member separating said liquid receiving chamber into two compartments; a liquid metering means establishing communication between said liquid receiving compartments; a reservoir adapted to contain a supply of liquid for said liquid receiving compartments, and means for constantly maintaining a pressure upon the liquid in said liquid receiving compartments and said reservoir.

5. In combination, means for actuating a relatively movable machine element including a housing formed with a cylindrical interior chamber; said housing being connected to the relatively movable machine element; a member having a portion extending into said housing; said member having a wall separating the chamber into two compartments; means for selectively supplying pressure fluid to said compartments to effect reciprocating movements of said housing and machine element; a second chamber spaced longitudinally from said first chamber in said housing; said member having a portion dividing said second mentioned chamber into two compartments; a passage in said portion for establishing communication between said compartments; a resiliently biased valve disposed in said passage arranged to facilitate flow of liquid from one compartment to the other through said passage in only one direction; metering means for establishing liquid flow from one compartment to the other; said metering means including an adjustable valve for regulating the rate of flow of fluid through said metering means, and means including a resiliently biased wall for establishing a pressure upon the liquid in said liquid receiving compartments.

6. In combination, means for actuating a relatively movable machine element including a housing formed with a cylindrical interior chamber; said housing being connected to the relatively movable machine element; a member having a portion extending into said housing; said member having a wall separating the chamber into two compartments; means for supplying pressure fluid to said compartments; valve means for selectively directing pressure fluid to said compartments to effect reciprocating movements of said housing and machine element; a second chamber spaced longitudinally from said first chamber in said housing; said member having a wall dividing said second mentioned chamber into liquid receiving compartments; a passage in said wall for establishing communication between said liquid receiving compartments; a resiliently biased ball check valve disposed in said passage to permit flow of liquid from one liquid receiving compartment to the other through said passage in only one direction; a bypass for establishing liquid flow from one compartment to the other; adjustable means in said bypass for regulating the rate of flow of fluid therethrough; a liquid reservoir formed in said housing; a movable wall in said reservoir, and resilient means cooperating with the movable wall for establishing a comparatively low pressure upon the liquid in said liquid receiving compartments.

7. In combination, actuating means for effecting reciprocating movements of a machine element including a housing connected with the element and having a pair of longitudinally spaced chambers formed therein; a relatively stationary support; a shaft having a threaded connection with said support and extending into said housing; a sleeve disposed in said housing and surrounding a portion of the shaft; said sleeve having spaced piston portions projecting respectively into the longitudinally spaced chambers; means associated with said shaft for manually adjusting the relative position of the housing and machine element with respect to the support; means for introducing pressure fluid alternately into the compartments of one set to effect reciprocatory movements of said housing and element, the other set of compartments being adapted to contain liquid; manually adjustable means for establishing communication between the compartments of said second mentioned set for controlling flow of liquid from one compartment to the other to establish the rate of linear travel of the housing and element under the influence of pressure fluid introduced into the first mentioned compartments.

8. In combination, actuating means for effecting reciprocable movements of a machine element including a housing connected with the element and having a pair of longitudinally spaced chambers formed therein; a relatively stationary support; a shaft having a threaded connection with said support and extending into said housing; a sleeve disposed in said housing and surrounding a portion of said shaft; said sleeve having spaced piston portions projecting respectively into the longitudinally spaced chambers; means associated with said shaft for manually adjusting the relative position of the housing and machine element with respect to the support; valve means for selectively introducing pressure fluid into compartments of one set to effect reciprocatory movements of said housing and element, the other set of compartments being adapted to contain liquid; a passage for establishing communication between the liquid receiving compartments; means for controlling flow of liquid from one liquid receiving compartment to the other to determine the rate of linear travel of the housing and element under the influence of pressure fluid introduced into the first mentioned compartments, and adjustable means for limiting the movement of the housing and element in one direction.

9. An actuating means for a work supporting table of a machine including a support for the table; said table being slidably mounted upon the support for rectilinear movement; a housing connected with the table and having a chamber formed therein; a shaft having a threaded portion in threaded engagement with the support; a sleeve surrounding said shaft and extending into said housing; said shaft being adapted to be manually rotated to move said table relative to the support; said sleeve having a piston portion separating said chamber into two compartments; means for selectively directing pressure fluid into one or the other of said compartments to effect movement of said table in either direction along said support; a second chamber formed in said housing and spaced from said first mentioned chamber and of lesser diameter; a second piston portion on said sleeve extending into said second mentioned chamber dividing the chamber into a pair of spaced annular compartments; means including a reservoir for maintaining liquid in said second mentioned compartments, and fluid metering means disposed in a passage connecting said liquid containing compartments for controlling the rate of linear travel of the table in one direction under the influence of the fluid pressure acting against said first mentioned piston.

10. An actuating means for a work supporting element including, in combination, a support for the element; said element being reciprocably mounted upon the support; a casing movable with the element and having a chamber formed therein; a shaft having a threaded portion in threaded engagement with the support; a sleeve surrounding said shaft and extending into said casing; said shaft being adapted to be manually rotated to move said element and casing relative to the support; said sleeve having a piston portion separating said chamber into two compartments; valve means for selectively directing pressure fluid into one or the other of said compartments to effect movement of said element in either direction along said support; a second chamber formed in said housing and spaced from said first mentioned chamber; a second piston portion on said sleeve extending into said second mentioned chamber dividing the chamber into a pair of spaced annular compartments; and adjustable fluid metering means disposed in a passage connecting said liquid containing compartments for controlling the rate of travel of the element under the influence of the fluid pressure acting against said first mentioned piston.

CLIFFORD L. GARRISON.

References Cited in the file of this patent

UNITED STATES PATENTS

| Number | Name | Date |
|---|---|---|
| 2,371,085 | Waters | Mar. 6, 1945 |
| 2,435,059 | Thompson | Jan. 27, 1948 |
| 2,559,531 | Belden | July 3, 1951 |